(12) United States Patent
Kim

(10) Patent No.: US 8,920,008 B2
(45) Date of Patent: Dec. 30, 2014

(54) SHIELD ACTUATOR FOR HEAD LAMP IN THE VEHICLE

(75) Inventor: Seho Kim, Seoul (KR)

(73) Assignee: LG Innotek Co., Ltd., Seoul (KR)

( * ) Notice: Subject to any disclaimer, the term of this patent is extended or adjusted under 35 U.S.C. 154(b) by 328 days.

(21) Appl. No.: 13/575,506

(22) PCT Filed: Nov. 22, 2010

(86) PCT No.: PCT/KR2010/008230
§ 371 (c)(1),
(2), (4) Date: Aug. 6, 2012

(87) PCT Pub. No.: WO2011/093583
PCT Pub. Date: Aug. 4, 2011

(65) Prior Publication Data
US 2012/0297907 A1 Nov. 29, 2012

(30) Foreign Application Priority Data
Jan. 26, 2010 (KR) .......................... 10-2010-0006925

(51) Int. Cl.
*F21V 7/00* (2006.01)
*B60Q 1/076* (2006.01)

(52) U.S. Cl.
CPC ...................................... *B60Q 1/076* (2013.01)
USPC ............................ 362/513; 362/512; 362/514

(58) Field of Classification Search
USPC ................................................. 362/512–515
See application file for complete search history.

(56) References Cited

U.S. PATENT DOCUMENTS

| 5,879,073 A | 3/1999 | Hori et al. |
| 7,926,992 B2 | 4/2011 | Kim et al. |
| 2003/0021119 A1 | 1/2003 | Blusseau et al. |
| 2005/0201117 A1 | 9/2005 | Sugimoto et al. |
| 2009/0109697 A1 | 4/2009 | Kim et al. |

FOREIGN PATENT DOCUMENTS

| CN | 10-1561108 A | 10/2009 |
| JP | 4226893 B2 | 2/2009 |
| KR | 10-0913545 B1 | 8/2009 |

OTHER PUBLICATIONS

International Search Report in International Application No. PCT/KR2010/008230, filed Nov. 22, 2010.
Office Action dated Jun. 25, 2013 in Japanese Application No. 2012-551073, filed Nov. 22, 2010.
Office Action dated Apr. 25, 2014 in Chinese Application No. 201080062362.3.

*Primary Examiner* — Sean Gramling
(74) *Attorney, Agent, or Firm* — Saliwanchik, Lloyd & Eisenschenk

(57) ABSTRACT

Disclosed is a vehicle head lamp-purpose shield actuator, including a case, and a motor fixed inside the case, and a first rotating shaft rotated by the motor to be connected to an output shaft that drives a shield member for controlling an opening angle of a head lamp, and a second rotating shaft disposed inside the case to be connected to an output shaft that drives a shield member for opening the shield member, wherein the case is constructed by an inter-coupling of a left side case and a right side case, and the left side case and right side case each having a shaft connection part connecting a first rotating shaft and a second rotating shaft, and an output shaft, respectively, thereby being used commonly in a left side head lamp and a right side head lamp, and consequently improving productivity and assembling capacity and reducing production expense.

10 Claims, 2 Drawing Sheets

SHIELD ACTUATOR FOR HEAD LAMP IN THE VEHICLE

CROSS-REFERENCE TO RELATED APPLICATIONS

This application is the U.S. national stage application of International Patent Application No. PCT/KR2010/008230, filed Nov. 22, 2010, which claims priority to Korean Application No. 10-2010-0006925, filed Jan. 26, 2010, the disclosures of each of which are incorporated herein by reference in their entirety.

TECHNICAL FIELD

The present invention relates to a vehicle head lamp shield actuator adjusting an illumination angle of a car head lamp.

BACKGROUND ART

In general, a vehicle has inside a head lamp, so that it is possible to drive while checking an unsure forward movement in the daytime or night time not ensured of a view field.

Each of the vehicle head lamps is angled at a different angle where the beam of left/right lamps illuminate based on a road system of each nation. An LHD (Left-Hand Drive) vehicle is configured such that a lamp beam illuminates much farther toward the right side of a proceeding direction around the central line of a road. On the other hand, a RHD (Right-Hand Drive) vehicle is configured such that the beam of a lamp illuminate much farther toward the left side of a process direction around the center line of a road.

In recent years, an AFS (Adaptive Front-lighting System) technology has been commercialized that automatically adjusts a head lamp direction according to the angle and progress direction of a vehicle steering handle. Such an Adaptive Front-lighting System has been configured to automatically adjust a width and length of light of a head lamp according to vehicle driving conditions, road conditions and/or environmental conditions.

The Adaptive Front-lighting System (AFS) includes a shield member adjusting an opening angle of a head lamp for controlling the illuminating angle of the head lamp and a shield actuator to drive the shield member.

A conventional shield actuator, as illustrated in FIGS. 1 and 2, is comprised of a lefthand side actuator 10 driving a shield member of a leftside head lamp, and a righthand side actuator 20 driving a shield member of a rightside head lamp.

The lefthand side actuator 10 is comprised of a case 16, a first shaft connection part 12 installed in one side of the case to connect with an output shaft adjusting an opening angle of a leftside head lamp, and a second shaft connection part 14 placed at a certain distance from the first shaft connection part 12 for connecting with an output shaft opening a shield member of the leftside head lamp.

And, the righthand side actuator 20 is comprised of a case 26, a first shaft connection part 22 installed in one side of the case 26 to connect with an output shaft adjusting an opening angle of a leftside head lamp, and a second shaft connection part 24 to connect with an output shaft opening a shield member of the leftside head lamp.

Such a previous shield actuator has a problem of a varying output shaft angle because an output shaft connecting to the first shaft connection part 12 of the lefthand side actuator 10 adopts and uses a program dissimilar from an output shaft portion connected to the first shaft connection part 22 of the lefthand side actuator 20.

That is, the lefthand side actuator 10 and the righthand side actuator 20 are all symmetrically constructed, which requires that a motor rotate in an individually different direction to control an output shat angle and thus nothing but using each different program, so that the output shaft angle may not be controlled equally.

Also, since a structure of the lefthand side actuator 10 is symmetrical to the righthand side actuator 20 and thus it needs to use a different mold on the injection of a case, a relative dimensional error may take place, and this can be a cause to an angle error of the output shaft.

For that reason, the lefthand side actuator 10 and the righthand side actuator 20 are separately manufactured, whereby a shield actuator fails to be universally employed and the number of components comprising the head lamp has disadvantageously increased.

DISCLOSURE OF INVENTION

Technical Problem

An object of the present invention is to provide a vehicle head lamp shield actuator of improving productivity and assembly and reducing a manufacturing cost by commonly applying a same shield actuator into a lefthand side head lamp and a righthand side head lamp.

In addition, another object of the present invention is to provide a vehicle head lamp shield actuator capable of identically controlling an angle of an output shaft by an management of one program, because a first shield actuator connecting to a left side head lamp and a second shield actuator connected to a right side head lamp have an identical structure.

The technical challenge to be achieved by the invention is not limited to the aforementioned, and it would be appreciated by those skilled in the art that other technical challenges can be understood from the following recitation.

Solution to Problem

A vehicle head lamp shield actuator according to one embodiment includes a case, a motor fixed inside the case, a first rotating shaft rotated by the motor to be connected to an output shaft that drives a shield member for controlling an opening angle of a head lamp, and a second rotating shaft disposed inside the case to be connected to an output shaft that drives a shield member for opening the shield member, wherein the case is constructed by an inter-coupling of a left side case and a right side case, and the left side case and right side case each have a shaft connection part connecting a first rotating shaft and a second rotating shaft, and an output shaft, respectively.

The first rotating shaft may be fixed with a first drive gear engaged to a pinion gear fixed to a drive shaft of the motor, and the second rotating shaft is fixed with a second drive gear engaged to the first drive gear.

A central side of the first rotating shaft may be fixed to the first drive gear, one end part is disposed in a left side case, and the other end part is disposed in a right side case.

A central side of the second rotating shaft may be fixed to the second drive gear, one end part is disposed in a left side case, and the other end part is disposed in a right side case.

The shaft connection part may include a left side shaft connection part installed at a lefthand case to connect to one end part of a first rotating shaft and a second rotating shaft, and a right side shaft connection part installed at a righthand case to connect to the other end part of a first rotating shaft and a second rotating shaft.

The left side shaft connection part may be connected to an output shaft that drives a shield member installed at a lefthand head lamp, and the right side shaft connection part is connected to an output shaft that drives a shield member installed at a righthand head lamp.

Advantageous Effects of Invention

A vehicle head lamp shield actuator according to the present invention can have a left side shaft connection part in a lefthand case and a right side shaft connection part in a righthand case, thereby being used commonly in a left side head lamp and a right side head lamp, and with advantages to improve productivity and assembly and reduce production expense.

Also, a vehicle head lamp shield actuator according to the present invention is advantageous in that a first shield actuator connected to a left side head lamp and a second shield actuator connected to a right side head lamp have a same structure, thus capable of controlling with one program and controlling an angle of an output shaft to be equal.

MODE FOR THE INVENTION

Figure 1:
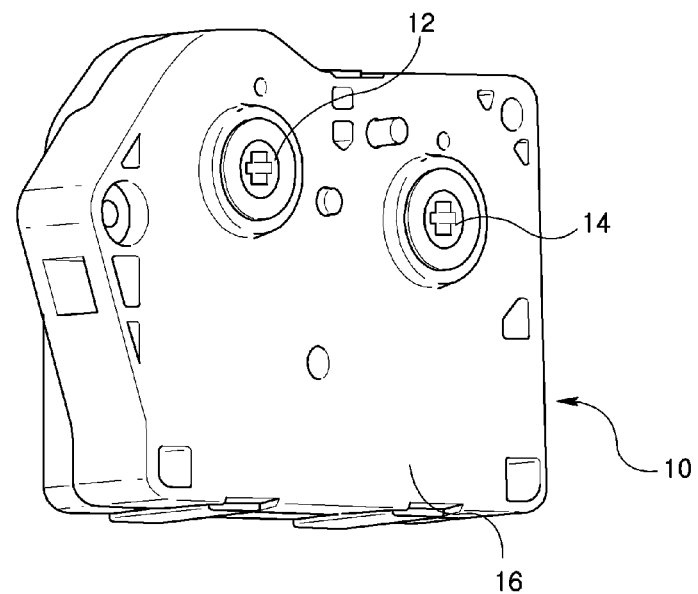
FIG. 1 is a perspective view of a left side actuator according to a prior art.
Figure 2:
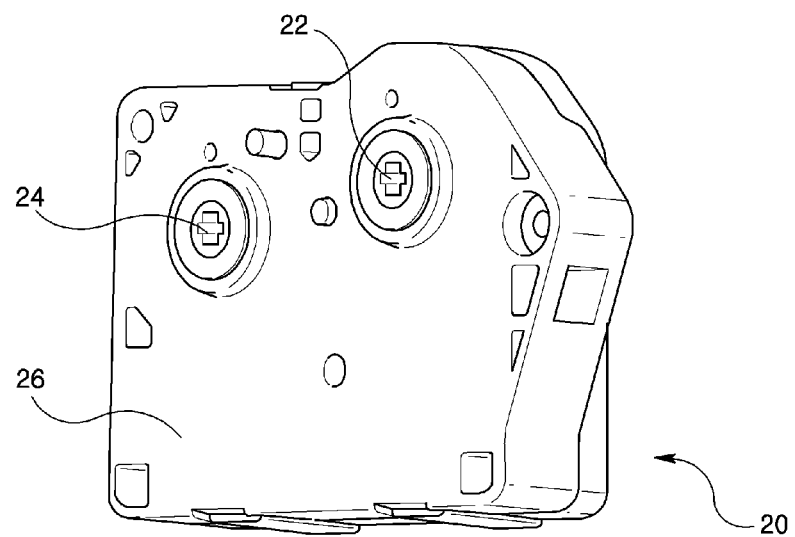
FIG. 2 is a perspective view of a right side actuator according to a prior art.

Hereinafter, a preferred embodiment of the invention will be described in consideration of the annexed drawings. The size and shape of components shown in the drawings during this procedure may be exaggerated or simplified for the sake of description's clarity and conveniences. Also, specially defined terms in consideration of the construction and function of the present invention may be varied according to the intention and custom of users and operators. Such terms-related definition should be made based on recitations throughout the entire specification.

Figure 3:
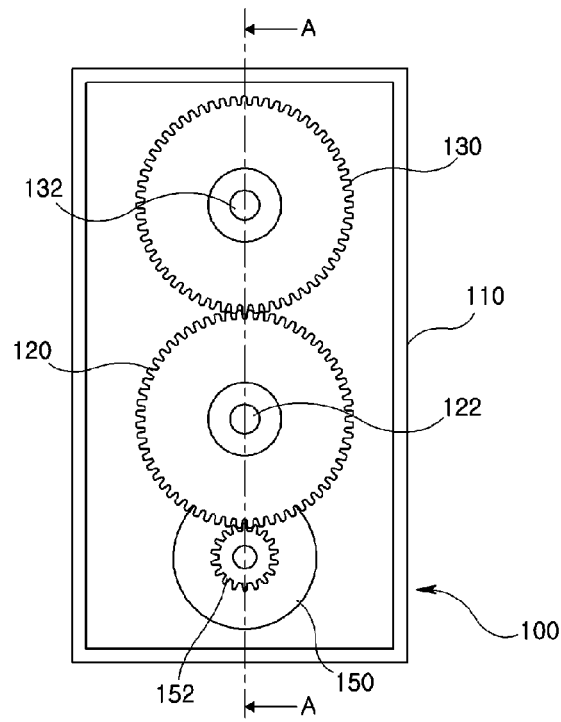
FIG. 3 is a plan view of a shield actuator according to one embodiment of the invention.
Figure 4:
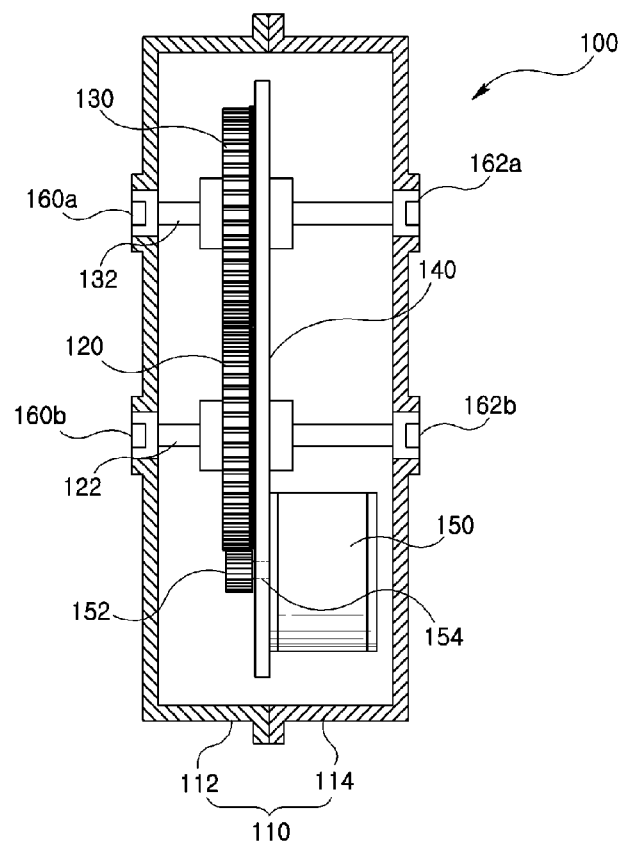
FIG. 4 is a cross-sectional view showing a cutting line of A-A of FIG. 3.

FIG. 3 is a plan view showing a shield actuator according to one embodiment of the present invention, and FIG. 4 is a cross-sectional view shown by cutting according to an A-A line of FIG. 3.

A vehicle head lamp-purpose shield actuator 100 according to one embodiment of the present invention includes a case 110, and a motor 150 fixed inside the case 110, and a first rotating shaft and second rotating shaft 132 rotated by the driving force of a motor 150, as shown in FIG. 3 and FIG. 4.

A head lamp (not shown) is constructed as a left side head lamp installed to a left side of a vehicle, and a right side head lamp installed to a right side of the vehicle, and the head lamp is installed with a shield member (not shown) controlling an illuminating angle of a head lamp by adjusting an opening angle of the head lamp.

And, a shield member is connected to an output shaft driving a shield member, and the output shaft is connected to a shield actuator 100 to adjust an opening angle of a head lamp according to the drive of the shield actuator 100.

A case 110 is configured as an inter-coupling of a left side case 112 and a right side case 114, and a motor 150 is disposed at one side of the case 110, and a motor drive shaft 154 is mounted with a pinion gear 152. And, the motor 150 is comprised of a stepping motor.

An inner part of the case 110 is connected to a motor 150, and when the motor 150 is driven, a rotating first drive gear 120 and a second drive gear 130 gear-engaged each are rotatably disposed. And, an inner part of a case 110 is disposed with a first drive gear 120 and a second drive gear 130, and installed with a printed circuit board 140 mounted with each kind of circuit components controlling motors, etc.

A first drive gear 120 rotates gear-engaged to a pinion gear 152 fixed to a drive shaft 154 of a motor 150 when the motor 150 circles around. And, a second drive gear 130 is gear-engaged with the first drive gear 120, and when the first drive gear 120 rotates, it rotates with together.

The first drive gear 120 and second drive gear 130 may be disposed on a same line with respect to the case 110, and the case 110 may be disposed left/right symmetrically to the case 110.

And, a first drive gear 120 and a second drive gear 130 are formed to have an equal diameter, and because they are mutually gear-engaged, rotates alike.

A central side of a first rotating shaft 122 is connected to a first drive gear 120, its one end part is disposed at the lefthand case 112, and the other end part is disposed at the righthand case 114.

A central side of a second rotating shaft 132 is connected to a first drive gear 130, its one end part is disposed at the lefthand case 112, and the other end part is disposed at the righthand case 114.

Such first rotating shaft 122 and second rotating shaft 132 are disposed on a same level.

The lefthand case 112 and righthand case 114 are provided with a shaft connection part 160a, 160b, 162a, 162b connected to a first rotating shaft 122 and a second rotating shaft 132 and an output shaft.

The shaft connection part is comprised of a left side shaft connection part 160a, 160b disposed at the lefthand case 112 and connected to one end part of a first rotating shaft 122 and a second rotating shaft 132, and a right side shaft connection part 162a, 162b disposed at the righthand case 114 and connected to the other end part of a first rotating shaft 122 and a second rotating shaft 132.

A left side shaft connection part 160a, 160b is disposed through the lefthand case 112, and connected to an output shaft driving a shield member of a left side head lamp.

And, a right side connection part 162a, 162b is disposed to penetrate the righthand case 114, and connected to an output shaft driving a shield member of a right side head lamp.

As such, a constructed shield actuator according to one embodiment of the invention may be for common use installed at both of the left side head lamp and the right side head lamp.

For one example, in a case a shield actuator is installed at the left side head lamp, a left side shaft connection part 160a, 160b is fixed with an output shaft driving a shield member of a left side head lamp, and in a case installed at the right side head lamp, a right side shaft connection part 162a, 162b is fixed with an output shaft driving a shield member of a right side head lamp.

While embodiments according to the present invention have been described above, these are only by way of example and it would be understood by those skilled in the art that any embodiment of various modifications and equivalents can be made thereto. Thus, the genuine technical scope of the present invention should be defined from the accompanying claims.

INDUSTRIAL APPLICABILITY

By means of a shield actuator according to one embodiment of the invention, a lefthand case is provided with a left side shaft connection part, and a right side case is provided with a right side shaft connection part, so that it is convenient to install because of common use at a left side head lamp and a right side head lamp, a manufacturing process can be simplified with no need to manufacture a shield actuator separately for left/right sides, and left/right lamp angles can be controlled by one program.

The invention claimed is:

1. A vehicle head lamp-purpose shield actuator, comprising:
   a case;
   a motor fixed inside the case;
   a first rotating shaft disposed inside the case and rotated by the motor to be connected to an output shaft that drives a shield member for controlling an opening angle of a head lamp; and
   a second rotating shaft disposed inside the case to be connected to an output shaft that drives a shield member for opening the shield member,
   wherein the case is constructed by an inter-coupling of a left side case and a right side case, and the left side case and right side case each having a shaft connection part, wherein the shaft connection part includes a left side shaft connection part installed at a left-hand case and a right side shaft connection part installed at a right-hand case, and the left side shaft connection part connects an output shaft to one end part of the first rotating shaft and connects an output shaft to one end part of the second rotating shaft for driving a shield member installed in a left-hand head lamp, and the right side shaft connection part connects an output shaft to the other end part of the first rotating shaft and connects an output shaft to the other end part of the second rotating shaft for driving a shield member installed in a right-hand head lamp.

2. The shield actuator of claim 1, wherein the first rotating shaft is fixed with a first drive gear engaged to a pinion gear fixed to a drive shaft of the motor, and
   the second rotating shaft is fixed with a second drive gear engaged to the first drive gear.

3. The shield actuator of claim 2, wherein a central side of the first rotating shaft is fixed to the first drive gear, one end part is disposed in a left side case, and the other end part is disposed in a right side case.

4. The shield actuator of claim 2, wherein a central side of the second rotating shaft is fixed to the second drive gear, one end part is disposed in a left side case, and the other end part is disposed in a right side case.

5. The shield actuator of claim 2, further including a printed circuit board installed inside the case to dispose the first drive gear and second drive gear.

6. The shield actuator of claim 2, wherein the first drive gear and second drive gear are disposed on a same line with respect to the case.

7. The shield actuator of claim 2, wherein the first drive gear and second drive gear are disposed left/right symmetrically to the case.

8. The shield actuator of claim 2, wherein the first drive gear and second drive gear have an equal diameter.

9. The shield actuator of claim 1, wherein the motor is constructed as a stepping motor.

10. The shield actuator of claim 1, wherein the first rotating shaft and second rotating shaft are parallelly disposed to each other.

* * * * *